US006033791A

United States Patent [19]

Smith et al.

[11] Patent Number: 6,033,791

[45] Date of Patent: Mar. 7, 2000

[54] WEAR RESISTANT, HIGH IMPACT, IRON ALLOY MEMBER AND METHOD OF MAKING THE SAME

[75] Inventors: Jerry I. Smith, Husum; Anthony E. Stout, Dallesport, both of Wash.

[73] Assignee: Smith and Stout Research and Development, Inc., Husum, Wash.

[21] Appl. No.: 08/835,109

[22] Filed: Apr. 4, 1997

[51] Int. Cl.[7] .......................... B32B 15/04; B22D 23/00; B22D 19/00

[52] U.S. Cl. .......................... 428/627; 428/681; 428/685; 164/47; 164/91; 164/97; 164/112; 148/543

[58] Field of Search .......................... 428/627, 681, 428/685; 164/47, 91, 97, 461, 473, 112; 148/540, 542, 543, 579

[56] References Cited

U.S. PATENT DOCUMENTS

| | | | |
|---|---|---|---|
| 4,119,459 | 10/1978 | Ekemar et al. | 75/243 |
| 4,787,564 | 11/1988 | Tucker | 241/275 |
| 4,796,822 | 1/1989 | Terrenzio | 241/275 |
| 5,007,475 | 4/1991 | Kennedy et al. | 164/97 |
| 5,183,518 | 2/1993 | Radon | 148/324 |
| 5,190,092 | 3/1993 | Revankar | 164/97 |
| 5,323,974 | 6/1994 | Watajima | 241/275 |
| 5,765,624 | 6/1998 | Hathaway et al. | 164/97 |
| 5,785,109 | 7/1998 | Hongawa | 164/59.1 |

*Primary Examiner*—Paul Thibodeau
*Assistant Examiner*—Holly Rickman
*Attorney, Agent, or Firm*—Flehr Hohbach Test Albritton & Herbert LLP

[57] ABSTRACT

A wear resistant, high-impact iron alloy member (20,22) suitable for use in an impact rock crusher and a method of making the same. The invention provides a white iron alloy member (20,22) having at least one wear surface (24) with carbide granules encapsulated in a matrix (28) of white iron and contained in a selected region adjacent the wear surface (24) of the member (20,22). The iron alloy member is made by a method of casting comprising the steps of: placing a molding insert (35,40) in a mold (60) at a selected location adjacent the wear surface (24); positioning a quantity of carbide granules (29), most preferably tungsten carbide granules 29, in the molding insert (35,40) before pouring; and pouring molten white iron alloy into the mold (60) to form the casting. The tungsten carbide granules (29) are substantially contained at a selected location by the molding insert (35,40), and the resulting casting (20,22) can be heat treated and cooled to provide a component for a rock crusher or the like which exhibits improved resistance to wear.

7 Claims, 5 Drawing Sheets

WEAR RESISTANT, HIGH IMPACT, IRON ALLOY MEMBER AND METHOD OF MAKING THE SAME

TECHNICAL FIELD

The present invention relates generally to iron alloy members with improved wear resistance and a method of making the same, and more specifically to white iron alloy members of the type employed in centrifugal impact rock crushers.

BACKGROUND ART

Wear and abrasion resistant, high impact, iron alloy members are employed in a variety of industries. In particular, such members, elements or components are often used in rock crushing machines for crushing rocks and ore in the mining and concrete industries. One method used to crush such rock is to employ a centrifugal rock crusher, and an example of a centrifugal rock crusher is found in U.S. Pat. No. 5,533,685.

Centrifugal rock crushing apparatus typically contain cast iron impact members which throw or propel the rock against stationary members to effect crushing of the rock. For example, cast iron impellers throw the rock against stationary cast iron anvil members, both of which are subjected to repeated high force impact loading. The wear face of such members receives the greatest impact and is subject to the greatest abrasion or wear. Consequently, the type of material used to fabricate such rock crusher components is of critical importance.

Cast white iron alloys are economical to produce and are widely used in the rock crushing industry. White iron alloys have been found to be one of the more impact and wear resistance of the iron alloys. As such, however, these alloys are still subject to significant wear and abrasion in high impact applications. Rapid wear of rock crusher components significantly increases downtime and maintenance, which adds cost to the operation. Thus, it is highly desirable to provide an iron alloy member capable of withstanding high impact and yet also has increased wear resistance, particularly at the impact or wear surface.

While it is well known to form impact rock crusher components of cast white iron alloy because of its high resistance to impact failure and because of its relatively good abrasion resistance, conventional cast white iron impellers and anvils sometimes have an expected life of only 6–8 hours before they must be replaced. The useful life of rock crusher impellers can be longer, for example, as long as 40 hours, depending upon the material being crushed, but in every case, it would be desirable to increase the life of these critical rock crusher components. Replacement of rock crusher impellers and anvils requires a shut down of the rock crusher, which may last for 2–4 hours, in order to remove and replace the old impellers and anvils. White iron alloy impellers and anvils are, however, still the preferred choice for use in centrifugal impact rock crushers.

DISCLOSURE OF INVENTION

It is a primary object of the present invention to provide high impact iron alloy members with improved wear resistance and a method of making the same.

More particularly, it is an object of the present invention to provide an iron alloy member, element or component comprising a combination of white iron and a localized region or matrix of a particulate, wear-increasing carbide material, preferably tungsten carbide, positioned at a selected high-wear location.

Another object of the present invention is to provide a method of casting an iron alloy member containing white iron and a localized concentration of particles of wear resistant carbide material.

A further object of the present invention is to provide cast iron alloy members that exhibit extended life during their use.

These and other objects and advantages are achieved by the method of the present invention for casting an iron alloy member having an improved region and by the member itself. The present method is comprised, briefly, of the steps of: placing a molding insert in a mold for casting of an iron alloy member at a selected location adjacent the wear surface. The insert is formed to contain a quantity of particulate, wear-increasing carbide material, such as tungsten carbide, substantially in place at the selected location during casting of the iron alloy member, and the insert is formed for the flow of liquid iron with minimal cooling over the particulate carbide material. The second step in the present method is comprised of positioning a quantity of wear-increasing particulate carbide material in the molding insert prior to pouring liquid iron alloy into the mold. The positioning step can be accomplished prior to the placing step or after the placing step. The final step in the present process is the step of pouring molten white iron alloy at a slightly elevated temperature as compared to conventional casting temperatures into the mold with the insert and particulate carbide material in the mold to cast the member of white iron with a wear-resistant region comprised of a matrix of white iron alloy and carbide particles contained by the insert at the selected high-wear location. In the preferred form the cast white iron member is then heat treated to reduce stresses and increase strength and then is cooled.

The invention also provides an iron alloy member having at least one wear surface comprised, briefly, of a cast white iron alloy with a particulate carbide material contained in a selected region adjacent the wear surface in a matrix of the white iron alloy and undissolved particles of carbide material to provide increased wear resistance at the region of the wear surface.

BRIEF DESCRIPTION OF THE DRAWING

Other objects and advantages of the invention will become apparent upon reading of the detailed description of the invention and the appended claims provided below, and upon reference to the drawings in which:

BEST MODE OF CARRYING OUT THE INVENTION

Figure 1:
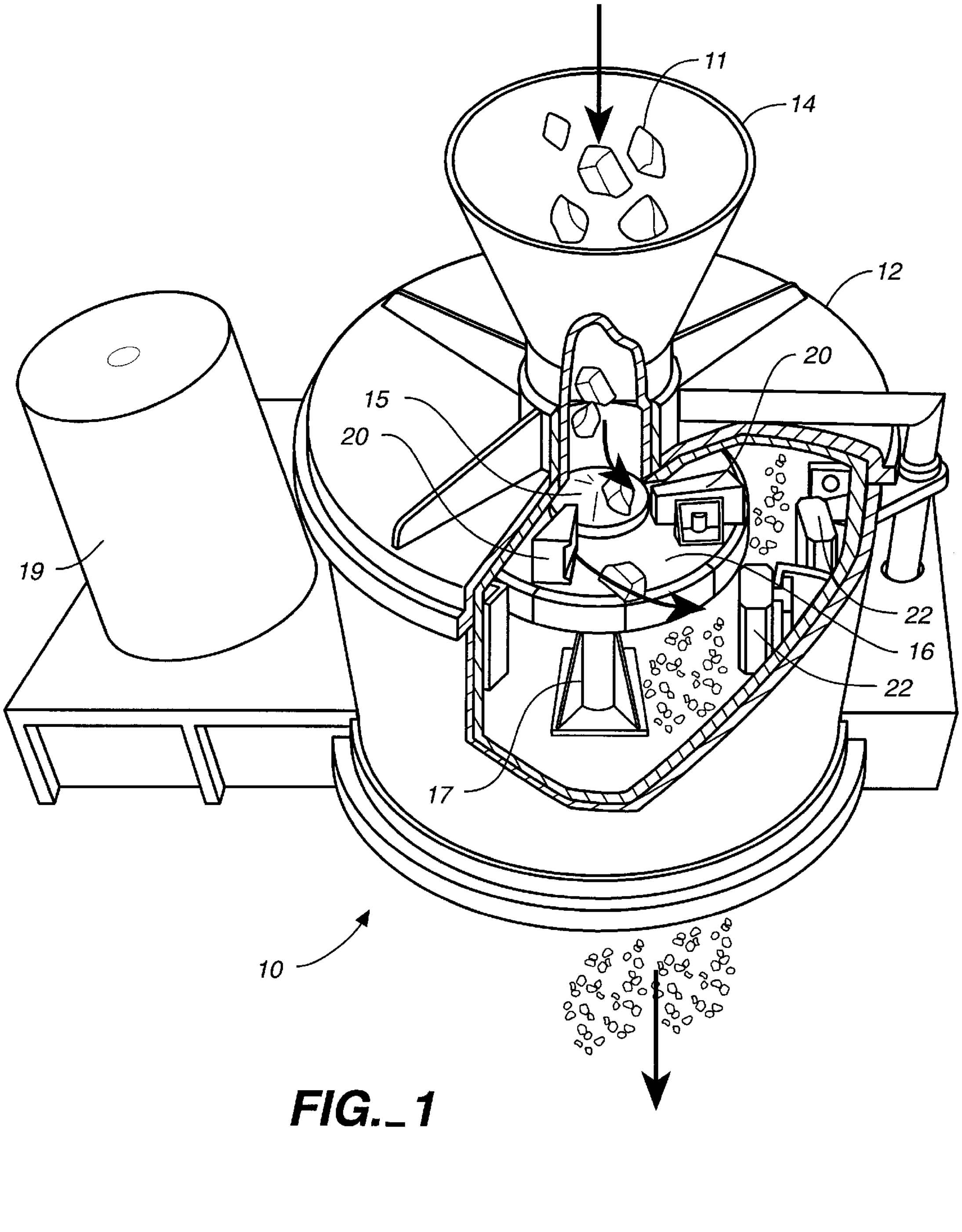
FIG. 1 is a top perspective schematic view, partially broken away, of a centrifugal impact rock crusher having impeller and anvil members which may be cast using the method of the present invention.

Turning to the drawings, wherein like components are designated by like reference numbers, FIG. 1 illustrates one form of a typical centrifugal impact-based rock crusher 10 which can advantageously employ iron alloy members made in accordance with the present invention. Rock crusher 10 generally includes a cylindrical housing 12, an input hopper 14 for directing materials to be crushed into housing 12, and a rotatably mounted turntable 16, having a feed cone 15 at its center. Turntable 16 is positioned about the central axis of housing 12 and hopper 14, and it is rotated by a drive shaft 17 and drive assembly including a motor 19. Attached to rotate with turntable 16 are a plurality of impeller members or elements 20, which are spaced apart around the periphery of turntable 16. A plurality of stationary anvils 22 are attached to the inside of the housing 12 and are spaced apart around the inner periphery of housing 12.

To operate the crusher, material 11, such as rock or ore, is placed in hopper 14 and drops onto feed cone 15 at the center of turntable 16. Turntable 16 is rotated at a high speed, for example, at speeds in the range of 850 to 2000 rpm, depending on the type and size of material 11 to be crushed. As table 16 turns, material 11 is directed by cone 15 outwardly toward impellers 20, which impact the rock and propel it with tremendous force toward anvils 22. As rock 11 hits both impellers 20 and anvils 22, and particularly the anvils, it is crushed or broken into pieces, which fall to a conveyor belt (not shown) below the housing.

Rock crusher components are subjected to high impact stresses. In particular, impellers 20 and anvils 22 experience great impact forces and high abrasion. Certain surfaces, i.e. the impact or wear surface, of these components are subjected to repeated impact and are susceptible to high abrasion, cracking and failure. Consequently, impact rock crusher impellers and anvils must be formed of a hard, abrasion-resistant material, yet they must also be cost effective to manufacture and operate.

Figure 2:
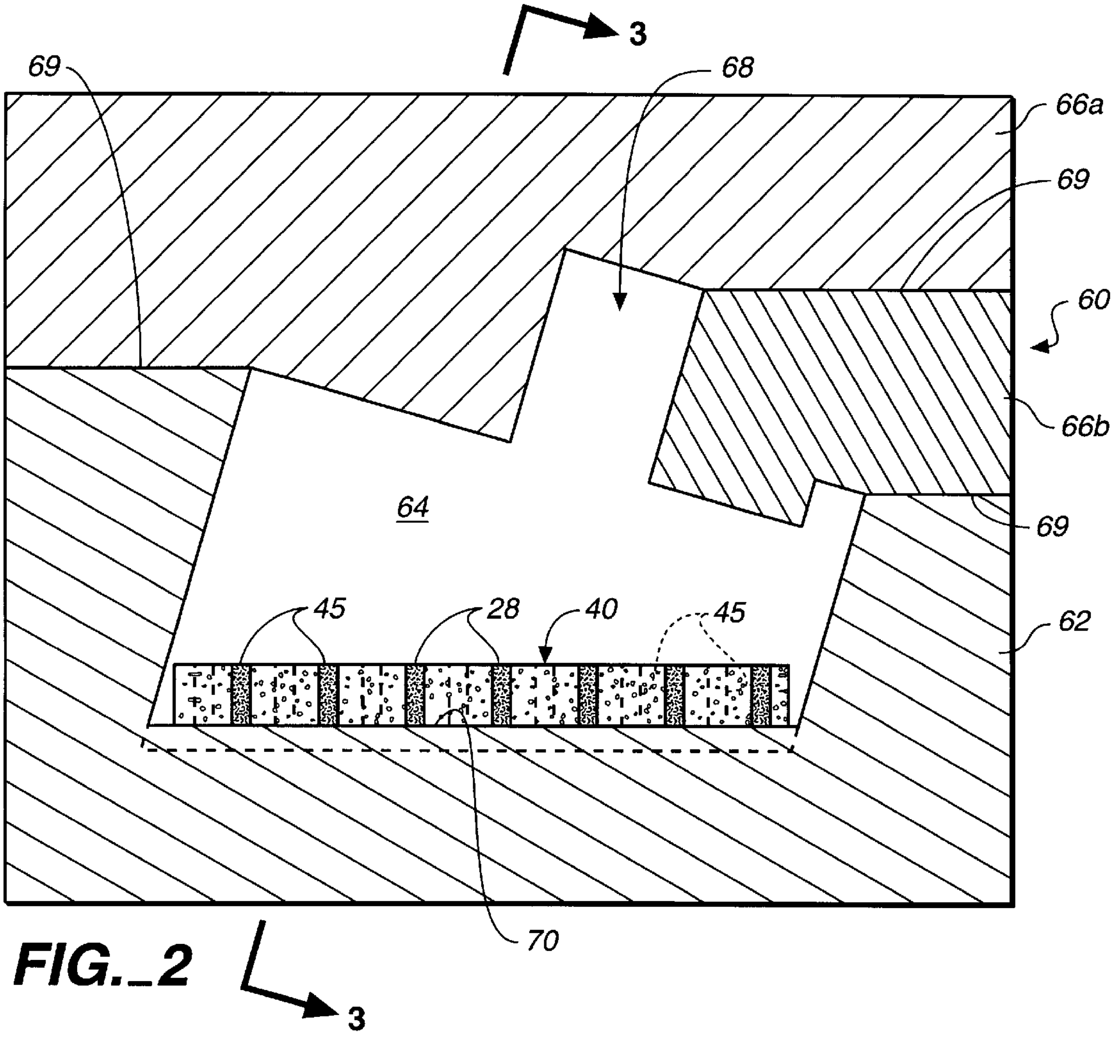
FIG. 2 is an enlarged, side elevation view of a mold, a mold cavity and a molding insert constructed in accordance with the present invention and used to make an impeller member of the type used in the rock crusher of FIG. 1.
Figure 3:
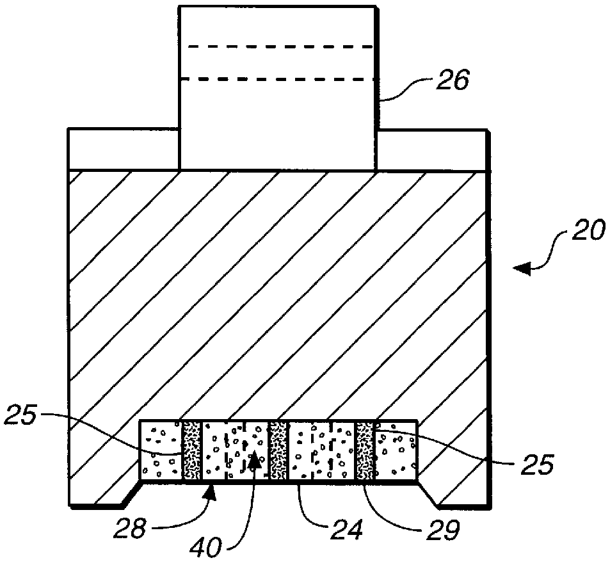
FIG. 3 is a cross-sectional view of the impeller made from the mold of FIG. 2, taken substantially along line 3—3 of FIG. 2 showing a wear-increasing particulate carbide-containing region disposed in the impeller member.
Figure 6:
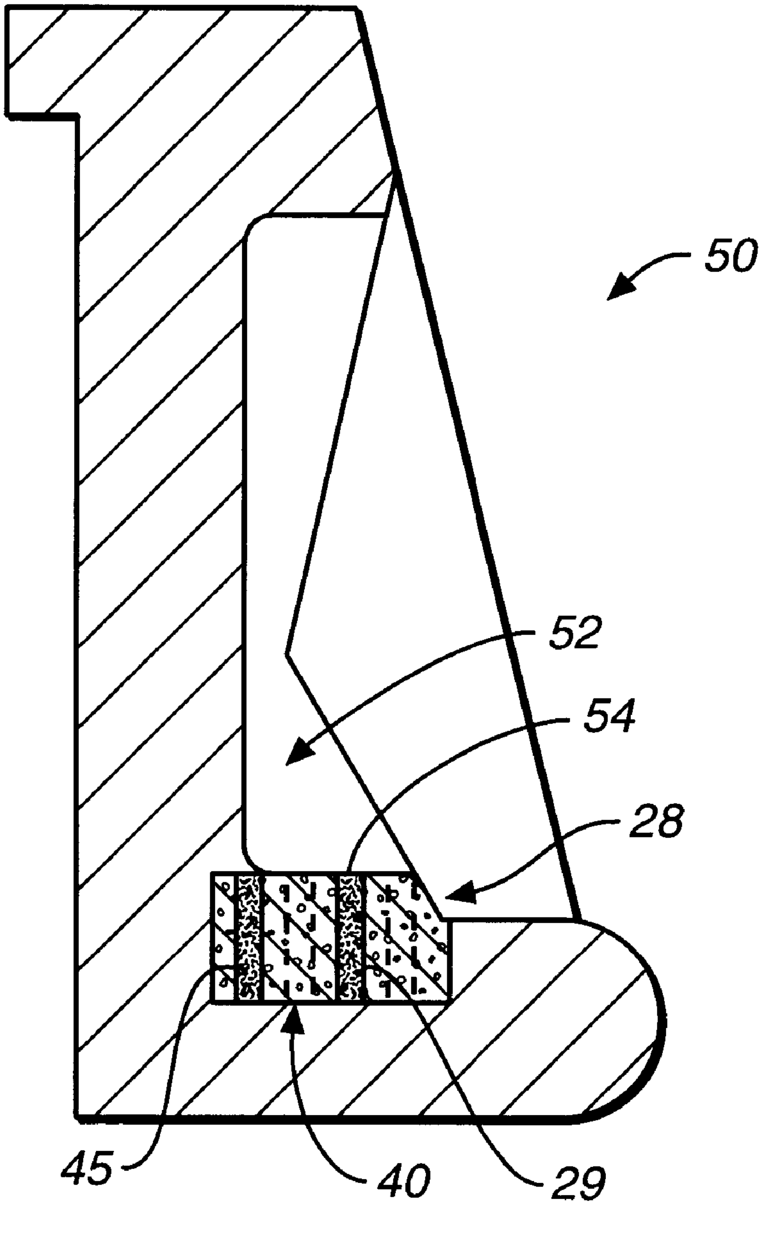
FIG. 6 is a top plan view, in cross section, of an impeller member in accordance with a second embodiment of the present invention.

Of particular advantage, the present invention provides a method of casting an iron alloy member, such as a rock crusher impeller or anvil, with increased wear resistance at the region of impact and wear of the component. FIG. 3 shows one form of impeller 20 which has been made in accordance with the present invention. FIG. 2 illustrates a side elevation view of a mold assembly suitable for casting impeller 20 with a high-wear region. Specifically, impeller 20 can be seen to have a trapezoidal shape with a flat or planar, slightly recessed wear surface 24 along a sloping side of impeller 20. Opposite of the wear surface is a mounting ear 26 for attaching impeller 20 to turntable 16. The impeller as shown in FIG. 3 has a particular shape, however, the present invention may be practiced with iron alloy members of any shape. Impellers in other forms of rock crushers, for example, will have differing configurations, and one such alternative impeller configuration is shown in FIG. 6. Moreover, the iron alloy members of the present invention are particularly well suited for use in forming anvils 22 and other components in rock crushers, such as feed cones 15.

Rock crusher impellers pose problems which are particularly difficult to solve. As above noted, rock crusher turntables often rotate at 1000 to 2000 rpm. It is essential, therefore, the impeller turntable 16 be precisely balanced when the impellers are first installed, and that the turntable remains balanced as the impellers wear down during use. Uneven wear during use will force a premature shut-down of the rock crusher and replacement of the impellers.

According to the present invention, a localized and contained region of particulate carbide material 28 is disposed within the body of the iron alloy member being cast, for example, impeller 20. Preferably, as shown in FIGS. 2 and 3, the region of particulate carbide material 28 is disposed adjacent wear surface 24, where it provides a region within the cast iron alloy member which has significantly increased wear resistance.

Broadly, the use of carbides as wear-increasing materials in iron is known. Cast white iron, however, can be sensitive to the addition of carbides, which have a much higher melting temperature than iron. Silicon carbides are easier to employ as a wear-increasing material in white iron, but they also are less effective than tungsten carbide in increasing abrasion resistance. Merely mixing carbide granules, such as tungsten carbide granules with the liquid or molten white iron prior to pouring it into the mold would increase wear resistance only slightly because only a limited quantity of tungsten carbide can be added before solidification or premature hardening of the white iron would occur. Tungsten carbide is heavier than white iron while silicon carbide is lighter. Because both carbides melt at much higher melting points, they will tend to settle or float in the molten white iron in unpredictable ways. Thus, when carbides are added or mixed with molten white iron and dispersed throughout the cast member, the casting will have only a slight overall increase in wear resistance, and attempts to increase the amount of carbide used cause a degradation of the resulting cast member, with unpredictable pockets of carbide material.

It also has been found that extremely fine powders of carbide materials tend to be less effective in increasing the wear resistance of white irons than granules or larger particles of carbides. It is believed that because the carbide does not combine with the white iron in an alloying sense, a larger granule of carbide in white iron matrix raises the wear resistance to a greater degree than fine powders.

In the product and process of the present invention, therefore, carbide, and preferably tungsten carbide or silicon carbide, is used as wear increasing material, but it is concentrated and contained in the mold using a molding insert over which liquid white iron is poured. Carbide granules are placed in a molding insert which predictably controls the position of the granules in the resulting casting. The granules are then completely surrounded and encapsulated by the white iron alloy to form a matrix at a selected region of the cast member, namely, proximate a wear surface.

The resulting cast product or member, therefore, has what is believed to be a matrix of white iron alloy and particles or granules of tungsten carbide or silicon carbide concentrated proximate the wear surface. The liquid white iron alloy flows around the carbide granules and completely surrounds and encapsulates them to produce a highly wear-resistant matrix.

The problem of adding tungsten carbide to cast white iron members is made more difficult for members, such as impellers, which are used in applications which require precise balancing. As will be appreciated, cast white iron alloy rock crusher impellers must be quite heavy. The entire turntable 16 is relatively massive and operates at high angular velocities. Any initial imbalance, or imbalance during impeller wear, will cause the overall turntable 16 to become imbalanced and require that the rock crusher be shut down.

Since tungsten carbide is heavier and silicon carbide is lighter than white iron, there is a tendency for the granules to migrate through the iron during casting. If the positioning of the particulate carbide in the cast member is not controlled during pouring, therefore, the resulting casting will not be balanced, or will wear in a manner which causes it to become imbalanced. Thus, in the present invention a molding insert is used to control the position of the particulate carbide material. The molding insert must be compatible with white iron alloy and yet capable of controlling the position of the carbide granules during casting. Thus, the tungsten carbide or silicon carbide must not get swept away in an unpredictable manner by flow of the molten white iron alloy into the mold, and the carbide cannot be free to migrate under gravitational influences in the molten white iron.

Turning now to FIGS. 2 and 3, more detail as to the manner in which the particulate carbide wear-resistant material can be positioned and contained within a mold during casting of a rock crusher impeller can be described. In FIG. 3, impeller 20 can be seen to have a matrix, generally designated 28, of a particulate carbide wear material distributed in white iron alloy adjacent a wear surface 24 of the impeller. Particulate carbide material 29 is distributed in matrix 28 in a plurality of columns 25, oriented substantially perpendicularly to the plane of the wear surface 24. Alternatively, carbide particles 29 may be a contained, continuous bed or mass along the wear surface, as shown and described below in connection with FIGS. 4*a* and 4*b*. The different distribution schemes depend upon the type of molding insert used to contain the carbide, and these molding inserts will be described in more detail below. While FIG. 3 shows placement of the particulate carbide region in one location, it is to be understood that wear matrix 28 may be placed at any desired location within the cast member.

Referring to FIG. 2, the present method employs a molding insert, generally designated 40, which is placed in a mold, generally designated 60. Mold 60, as shown in the drawing, is a three-part mold having a lower mold portion 62, which defines a portion of a lower mold cavity 64, and two upper mold portions 66*a* and 66*b* which define the remainder of lower cavity 64 and an upper mold cavity 68. White iron alloy mold are conventionally sand casting molds. Other mold configurations and parting lines 69 can be employed, and for simplicity, sprues and air vents are not shown.

In order to control the position of the wear-resistant particulate carbide in the resulting molded product, a molding insert 40 is placed on or positioned in mold 60. The form of molding insert used in FIG. 2 is illustrated in more detail in FIGS. 5*a* and 5*b*. When the particulate carbide is heavier than white iron, such as tungsten carbide, insert 40 is positioned immediately over a mold surface 70, which surface will produce wear surface 24 of the impeller. Molding insert 40 is formed to receive and laterally contain the particulate tungsten carbide material, which will be urged by gravity in the lighter white iron against mold surface 70. Insert 40, containing tungsten carbide, may be placed in any selected location within mold 60, but when tungsten carbide is used the location preferably is proximate a lowermost area of the mold for gravity containment and preferably is adjacent to the wear surface. Insert 40 will usually be first placed in mold cavity 64 and then filled with tungsten carbide granules while it is in the mold. The insert may be secured in the mold cavity by fasteners to hold it in place. Depending on the location of the wear surface, the insert may lie flat along the bottom of the mold, or in a vertical orientation against an outside surface. If the molding insert is not located in the mold for automatic gravity containment of the carbide granules during the pour, the insert will need to include a perforated containment wall or a wax which will hold the granules in place for a long enough period of time that they cannot gravitate away from the molding insert to a degree which is unpredictable.

Once an insert containing the particulate carbide is placed at the desired location within the mold cavity, molten white iron is poured into the mold cavity. The white iron fills the cavity, submerges the insert and flows through and around the granular carbide material to form a matrix therewith. The white iron alloy is poured at a high temperature, preferably at a temperature in the range of approximately 2700° F. to 2775° F. This temperature range is slightly higher than the conventional temperature (2550 to 2575° F.) at which white iron alloy castings are usually poured to allow for the cooling effect of the mass of the molding insert and the mass of particulate carbide material. This slightly elevated pour temperature insures even flow of the white iron into the molding insert and around the carbide granules before the iron alloy sets up.

Preferably, the white iron alloy employed in the invention is an ASTM Specification A532, class IIIA alloy, which has the following composition: 2.3 to 3.0 weight (wt) % carbon, 0.5 to 1.5 wt % manganese, up to 1.0 wt % silicon, up to 1.5 wt % nickel, 23.0 to 28.0 wt % chromium, and up to 1.5 wt % molybdenum, plus trace impurities. Most preferably, the white iron will contain a chromium content of about 25 wt percent. It is believed that the method of the present invention is also suitable for use with other cast iron alloys.

The particulate carbide material used in the method and member of the present invention is selected from the group comprising tungsten carbide and silicon carbide granules. Tungsten carbide, however, is preferred over silicon carbide since it produces a wear-resistant region in the resulting cast member which provides an improved wear life for the component.

In order to achieve the best abrasion resistance, it is further preferable that the particulate carbide have a granule nominal diameter size in the range between about 50 mesh to about ¼ inch. Most preferably the granule size is in the range of about 14 mesh to about ¼ inch. This particle range insures sufficient size of the carbide in the white iron matrix that the wear characteristics will more closely approach those of the carbide material than the white iron.

The most preferred carbide granules for use in the present invention are tungsten carbide granules having 12–18 weight percent of cobalt. These granules are preferably used in a size range of 3/16 to ¼ inch nominal diameter, and are known as "Impact Grade with Crushed Rounded Corners."

After the molten white iron is poured into the mold over the molding insert with particulate carbide in it, the casting preferably is heat treated. As cast, before heat treatment, the white iron will have a predominately pearlitic microstructure. Heat treating may perform a number of functions, such as, introducing new microstructure to the alloy, and making the composition more uniform, but the primary advantages are reducing internal stresses, particularly in the area of matrix 28, and increasing overall casting strength. Specifically, the casting it heated to a temperature preferably in the range of approximately 1820° F. to 1890° F. over a total time period of about 16 to about 19 hours. The casting is heated slowly in step-wise increments. Preferably the step increments are as follows: step 1 from 0 to 400° F. for 2 hours; step 2 from 400 to 800° F. for 4–5 hours, step 3 from 800 to 1200° F. for 4 hours, and step 4 from 1200 to 1890° F. for 7–8 hours.

After heat treating, the casting is cooled by using a fan or blower to blow ambient air over a mass of cast parts. The result is a cast white iron alloy part or member 20,22 having a high wear-resistant region or matrix 28 of particulate carbide contained in a selection location.

Figure 4A:
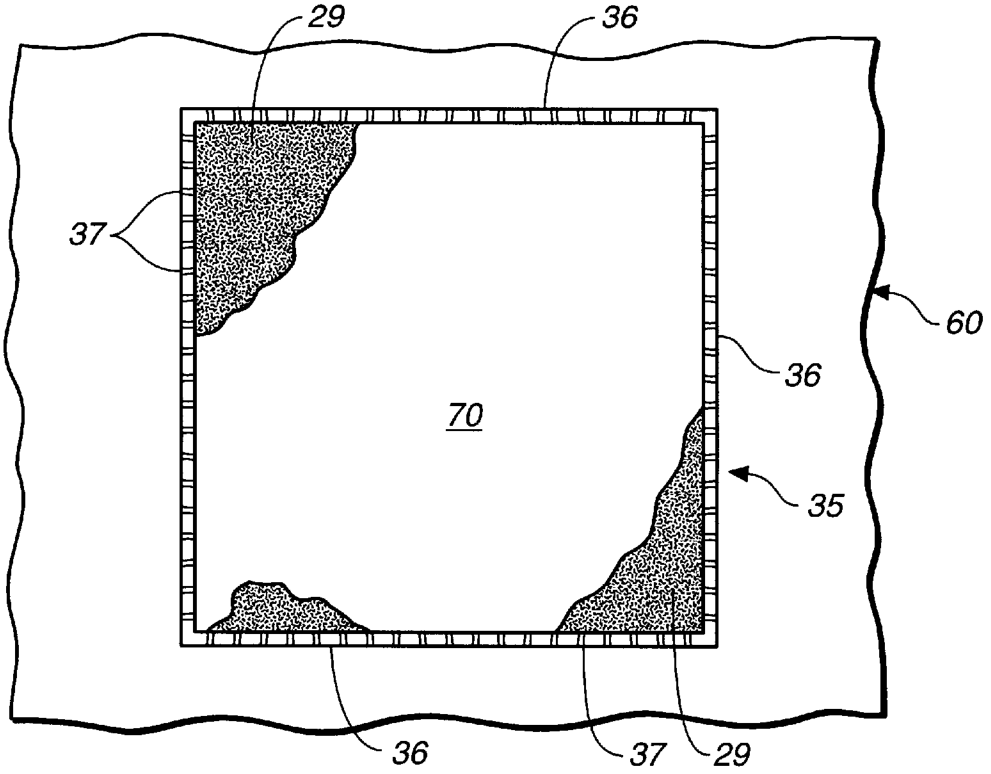
FIGS. 4*a* and 4*b* are a top plan view, and cross-sectional side elevation view, respectively, of a molding insert in accordance with one embodiment of the present invention.
Figure 4B:
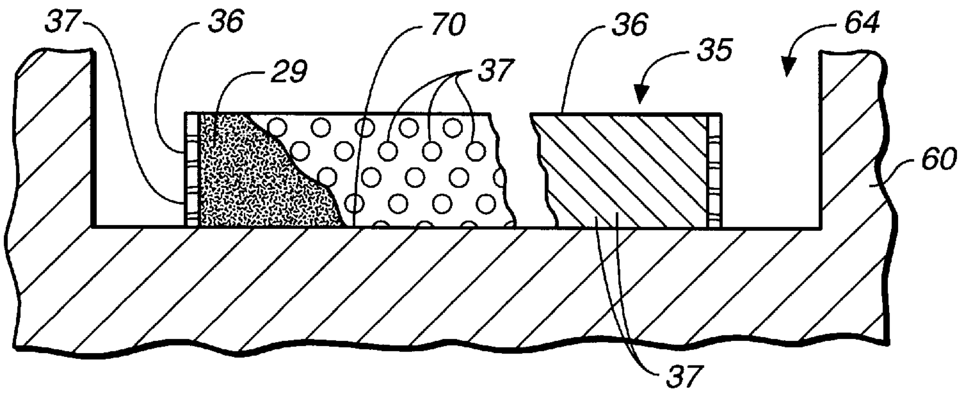
Figure 5A:
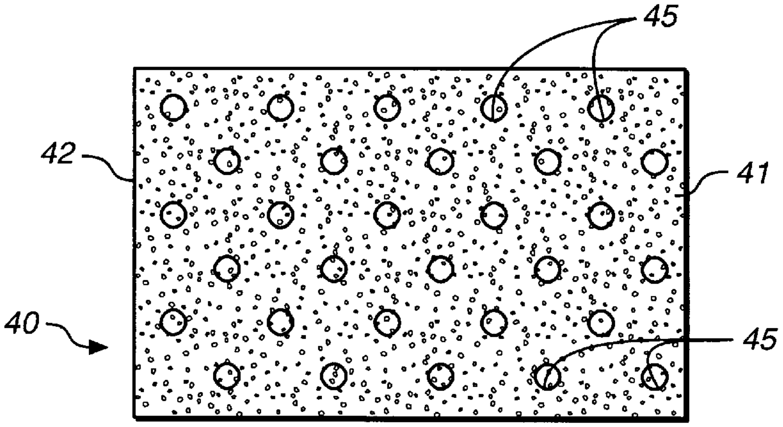
FIGS. 5*a* and 5*b* are a top plan view, and cross-sectional side elevation view, respectively, of a molding insert in accordance with an alternative embodiment of the present invention.
Figure 5B:
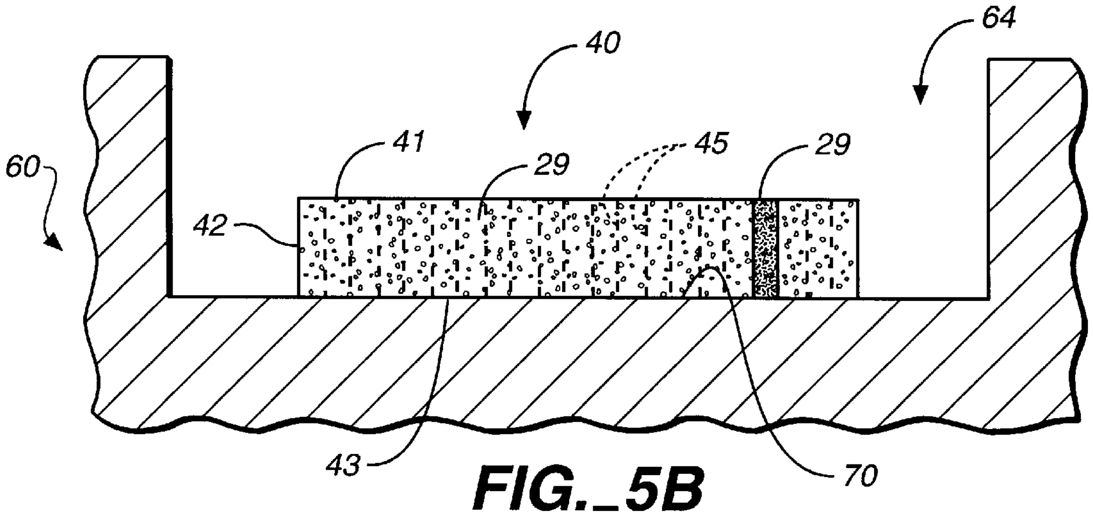

Molding insert 40 which is employed to contain the particulate carbide must be compatible with the resulting casting. As used herein, the expression "compatible" means that the molding insert must be capable of remaining in the cast member without significantly effecting its strength, impact resistance or wear resistance. One such compatible molding insert is shown in FIGS. 4*a* and 4*b* and is formed of stainless steel which melts and is absorbed into the molten white iron during casting. Another compatible molding insert is shown in FIGS. 5*a* and 5*b* and is a porous zirconium ceramic body of the type previously used in a mechanical filter for removal of impurities from molten metal alloys. This porous ceramic filter material does not dissolve in the molten white iron, but can remain embedded in the white iron and carbide matrix without significantly reducing either the impact strength or the wear resistance of the part. The insert must also be designed such that it contains the particulate carbide during the pouring and setting up of the white iron, which requires that the insert not break down too rapidly, if at all. Finally, the molding insert must allow the flow of the molten white iron rapidly into the carbide granules while they are contained so that the granules are surrounded and encapsulated by the white iron to form a relatively uniform matrix.

In FIGS. 4*a* and 4*b* a molding insert 35 is shown which is comprised of four side walls 36 that define a volume in which a bed or quantity of tungsten carbide granules 29 can be contained. Optionally, insert 35 may have a top and/or bottom surface (not shown) to provide a tray-like structure for ease of handling or for containment of the granules. As stated above, it is important that the molding insert be compatible with white iron, but it also must withstand the pour of molten white iron long enough to maintain containment of the carbide granules.

Typically, the sprue in mold 60 will be located in a position which causes the molten white iron to enter mold 60 from a side of cavity 64. Molding insert 35 is formed of a material which will melt and be absorbed in the molten white iron, but not so fast as to allow tungsten carbide granules 29 to flow with the white iron away from the wear surface. To achieve this end, in this embodiment, insert 35 is preferably comprised of stainless steel, which, of course, is a closely related metal to high chromium white iron. Most preferably insert 35 is comprised of heavy gauge stainless steel having a plurality of openings 37 which will permit the flow of white iron from the sides of the insert into the bed of tungsten carbide granules 29, as the molten white iron enters the mold from a side of cavity 64. The stainless steel walls 36 will melt when contacted by the molten metal, however, by employing a heavy gauge steel, most preferably 14 gauge steel, stainless steel insert 35 melts at a slow enough rate to keep the tungsten carbide granules from being swept away, or gravitating, from the desired region. The openings or perforations allow the molten white iron to penetrate and flow within granules in the insert. Openings 37 may be in the range of 1/16 inch to 1/8 inch diameter, with a diameter of 1/8" being preferred for granules having a nominal diameter of about 3/16 inch to about 1/4 inch. The size of the openings or perforations will vary depending on the size of the carbide granules. The perforations should be as large as possible but smaller than the diameter of the granules to resist being carried by the molten iron out of the molding insert. If a very fine grade of tungsten carbide is used, such as No. 14 mesh carbide side walls 36 of the insert 35 may be waxed to contain tungsten carbide granules 29 in the desired region. The wax will quickly melt and allow the molten iron to flow into the insert and yet will prevent excessive washing away of granules.

As the pour progresses, molten white iron also flows over the top of insert walls 36 and over the top of the exposed bed tungsten carbide granules and down into the granules. The container type of insert shown in FIGS. 4*a* and 4*b* allows the placement of a large quantity of tungsten carbide granules at the selected location within the cast member. For example, this type of molding insert would be particularly suitable for use in casting an impeller used to crush very hard material.

As shown in FIGS. 4*a* and 4*b*, molding insert 35 is placed on a lowermost surface 70 of mold 60 and the granules 29 are tungsten carbide. Thus, the greater density of the tungsten carbide relative to the white iron causes granules 29 to remain gravity biased in place in an open topped molding insert 35. If silicon carbide granules are to be used, the lesser density of such granules would require a perforated top wall on insert 35 to contain the granules against floating away during the pour. This is somewhat less desirable than tungsten carbide in that the top will slow, to some degree, flow of molten white iron over the top of the bed of granules.

It also would be possible to cast matrix 29 in an upper surface of mold 60 when silicon carbide granules are employed and provide a perforated bottom wall in insert 35.

A second embodiment of the molding insert in accordance with the present invention is shown in FIGS. 5*a* and 5*b*. The molding insert 40 is comprised of a wafer-like, porous ceramic filter material having four side surfaces 42, a top surface 41, and a bottom surface 43. Insert 40 further contains a plurality of bores 45 formed for receipt and containment of carbide granules 29. Preferably, bores 45 extend through insert 40 and are distributed relatively evenly throughout the area of the insert to form a relatively uniform pattern.

Of particular advantage, ceramic member insert 40 is also highly porous and capable of withstanding the high temperature of the molten iron, while allowing the flow of molten iron within the insert to bores 45 holding the carbide granules. Ceramic filters are widely used in the metal casting industry to mechanically remove slag from molten metals so they readily permit flow of the metal through the ceramic wafer without dissolving. Ceramic insert 40 is preferably a porous zirconia ceramic, such as filter material known as "Partially Stabilized Zirconia with Magnesia" and manufactured by Hi-Tech Ceramics, Inc. of Alfred Station, N.Y. The zirconia ceramic is not absorbed or melted during the molten iron pour, and thus the ceramic insert is retained in the resulting cast member. The porosity of the ceramic insert is preferably in the range of about 10 to about 15 pores per linear inch (ppi), with a pore size of 10 ppi being preferred.

The number and orientation of the of bores 45 in ceramic insert 40 may vary, and will generally depend upon the size of member or rock crusher component to be cast. For example, a small casting might typically employ a 3 inch by 6 inch molding insert having a height of about one inch. For this size insert 40, the diameter of the bores 45 are generally about 1/4 inch and the center to center spacing of bores 45 is about 1/4 inch. Preferably, bores 45 are spaced from the edges of the member 40 by about 1/4 inch to 1/2 inch. For a larger casting, a ceramic molding insert might typically have the dimensions of 4.5 inches by 7.5 inches by 1.0 inches. For this size insert, the diameter of bores 45 are generally about ½ inch and the center to center spacing of bores 45 is about ½ inch. Preferably, bores 45 are spaced from the edges of the member 40 by about ¼ inch to ½ inch.

Bores 45 are preferably distributed throughout insert 45 in a substantially uniform manner, but they may be staggered or linear in placement. The limited area of the smaller sized molding inserts may not allow staggering. Using this molding insert design, the carbide granules are distributed substantially in a matrix of columns (i.e., bores 45), orientated substantially perpendicular to the plane of the wear surface 24. The perpendicular orientation insures even mass distribution in the cast part during wear, if the wear surfaces are oriented either perpendicular or parallel to the spin axis of turntable 16. It is important to orient and space columns or bores 45 in a manner that the resulting part will not become dynamically unbalanced in parts or components which are conventionally rotated at high spin rates.

In an alternative embodiment of ceramic wafer type insert 40, a collar or walled boundary similar to the embodiment of FIGS. 4*a* and 4*b* may be used instead of continuous wafer or plug 40. Specifically, four 1 inch thick and 1 inch high strips of zerconia ceramic may be arranged to form a collar or wall surrounding a bed of carbide granules.

When tungsten carbide granules 29 are employed the upper ends of bore 45 do not need to be waxed to prevent granule migration, but when silicon carbide granules are used, the lighter density makes it advantageous to wax closed to the upper ends of bores 45.

When either a continuous plug or a collar-type ceramic molding insert is used, molten white iron is then poured into the mold and flows within the ceramic insert 40 via the pores to encapsulate the granules of carbide material. When the pour reaches the top of the insert, molten white iron flows over the entire insert and over all of bores 45. The cast member has the ceramic insert intact in the matrix 28, and when it is removed from the mold, the presence of ceramic insert 40 in matrix 28 does not significantly effect the casting strength. The carbide granules are localized in the selected region adjacent the wear surface 24, thereby providing increased wear and abrasion resistance at the wear surface.

Ceramic molding insert 40 allows the placement of a smaller amounts of carbide within a selected location in the member or component than molding insert 35. Depending on the application, one or the other type of molding insert may be the most suitable.

To show the different applications and the different placement of the particulate carbide wear matrix 28, attention is drawn to FIG. 6. In this embodiment, an impeller 50 is provided which has a pocket depression or "scoop" 52. This type of impeller design is particularly suitable for applications where the material to be crushed contains a significant amount of dirt. At one end of the base of pocket 52 is a surface 54 which receives the greatest wear during operation, and is designated as the wear surface. According to the present invention, impeller 50 is cast with a molding insert 55 (here shown as a porous ceramic wafer) containing particulate carbide 29. Molding insert 55 is located adjacent the wear surface 54, with the carbide granules in bores or columns 45 having a substantially vertical orientation, to provide a strengthening region of carbide material where it is most beneficial.

EXAMPLES

Impellers constructed as shown in FIGS. 2 and 3 have been cast using the method of the present invention with the following constituents:

| White iron | Tungsten Carbide | Molding Insert |
|---|---|---|
| 25 pounds | 2 pounds | ceramic wafer |
| 70 pounds | 2.5 pounds | ceramic wafer |
| 70 pounds | 3 pounds | stainless collar |
| 100 pounds | 4.5 pounds | ceramic wafer |
| 100 pounds | 5.0 pounds | stainless collar |

These impellers have been used in rock crushers and a significant increase (50 to 150%) in the service life of the impellers was achieved.

The foregoing description of specific embodiments of the invention have been presented for the purpose of illustration and description. They are not intended to be exhaustive or to limit the invention to the precise forms disclosed, and obviously many modification, embodiments, and variations are possible in light of the above teaching. It is intended that the scope of the invention be defined by the claims appended hereto and their equivalents.

What is claimed is:

1. A method of casting a wear-resistant, high-impact iron alloy member having at least one wear surface, comprising the steps of:

placing a porous ceramic molding insert in a mold for casting said member at a selected location adjacent said wear surface, said insert being formed with at least one sidewall providing a collar defining a volume for containing a quantity of wear-resistant carbide granules substantially in place in said mold at said selected location during casting of said member, and said insert being compatible with and unmelted by molten white iron alloy for flow of molten white iron into said insert and over said carbide granules to completely surround and encapsulate said carbide granules;

positioning a quantity of carbide granules in said insert prior to pouring molten white iron into said mold; and pouring molten white iron alloy into said mold with said insert and said carbide granules in said mold to cast said member of a matrix of white iron alloy and said carbide granules contained by an unmelted insert substantially at said selected location adjacent said wear surface.

2. The method as defined in claim 1 wherein, said positioning step is accomplished by positioning a quantity of tungsten carbide granules in said insert.

3. The method of claim 2 wherein, said placing step is accomplished by placing said molding insert against a lowermost wall of said mold for gravity biasing of said tungsten carbide granules in said molding insert against said wall.

4. The method of claim 2 wherein, said step of pouring molten white iron is accomplished by pouring molten white iron into said mold at a temperature in the range of about 2700° F. to about 2775° F.

5. The method of claim 2 wherein, said positioning step is accomplished by positioning tungsten carbide granules in said molding insert having a size in the range of about 50 mesh to about ¼ inch.

6. A cast iron alloy member made by the method of claim 2.

7. A method of casting a wear-resistant, high-impact iron alloy member having at least one wear surface, comprising the steps of:

placing a porous ceramic molding insert in a mold for casting said member at a selected location adjacent said wear surface, said insert being formed to contain a quantity of wear-resistant carbide granules substantially in place in said mold at said selected location during casting of said member, and said insert remaining unmelted by molten white iron alloy for the flow of molten white iron over said carbide granules to completely surround and encapsulate said carbide granules;

positioning a quantity of carbide granules in said insert prior to pouring molten white iron into said mold; and pouring molten white iron alloy into said mold with said insert and said carbide granules in said mold to cast said member of a matrix of white iron alloy and said carbide granules contained by an unmelted insert substantially at said selected location adjacent said wear surface.

* * * * *